United States Patent [19]

DeNicola, Jr.

[11] Patent Number: 5,047,446

[45] Date of Patent: Sep. 10, 1991

[54] THERMAL TREATMENT OF IRRADIATED PROPYLENE POLYMER MATERIAL

[75] Inventor: Anthony J. DeNicola, Jr., Newark, Del.

[73] Assignee: Himont Incorporated, Wilmington, Del.

[21] Appl. No.: 223,136

[22] Filed: Jul. 22, 1988

[51] Int. Cl.$^5$ .................. C08J 3/28; C08F 110/06
[52] U.S. Cl. ........................... 522/157; 522/3; 522/915; 526/351; 528/503
[58] Field of Search .................................. 522/157

[56] References Cited

FOREIGN PATENT DOCUMENTS 190889 8/1986 European Pat. Off. .

Primary Examiner—Marion E. McCamish
Assistant Examiner—Arthur H. Koeckert

[57] ABSTRACT

Disclosed is a method of treating a free-radical-containing, optionally room-temperature-aged, irradiated, normally solid high-molecular-weight, semi-crystalline propylene polymer material at about from 40° C. to 110° C. for at least about 10 minutes before being exposed to the higher temperatures that deactivate the residual free radicals therein. Treatment of the polymer at the intermediate temperature causes recombination, and better utilization, of free radicals with the production of more long-chain branching. A two-stage fluid bed process, with a first stage at the intermediate temperature for radical recombination and a second radical-deactivation stage at a higher temperature, is preferred.

12 Claims, 4 Drawing Sheets

THERMAL TREATMENT OF IRRADIATED PROPYLENE POLYMER MATERIAL

BACKGROUND OF THE INVENTION

1. Field of the Invention

The present invention relates to the thermal treatment of irradiated propylene polymer material to render it stable on long-term storage in the presence of oxygen, and, more particularly, to an improved method of effecting the recombination of free radicals present in the irradiated material and, subsequent thereto, the deactivation of free radicals still remaining therein.

2. Description of the Prior Art

European patent application publication no. 190,889, published Aug. 13, 1986, describes high-molecular-weight, long-chain branched polypropylene made by irradiating linear polypropylene with high-energy ionizing radiation. The free-end branched polymer is gel-free and has strain-hardening elongational viscosity.

The process described in the aforementioned European publication for making the branched polymer comprises irradiating linear polypropylene with high-energy ionizing radiation in an oxygen-deprived environment, aging the irradiated material at about room temperature in the same type of environment for preferably about from 2 to 30 minutes, and then deactivating or quenching the residual free radicals by the application of heat or by the addition of an additive, e.g., methyl mercaptan, that functions as a free-radical trap. The purpose of the room-temperature aging is to allow partial recombination of the radicals to occur to produce long-chain branching. Thermal radical-deactivation methods disclosed in the above publication include a melt extrusion process described in the examples and a process utilizing a fluidized bed system.

In a process for irradiating polypropylene with the objective of producing long-chain branching, it is important to give particular attention to the fact that the radical recombination which is necessary for the production of branching occurs in a solid matrix and consequently is likely to be diffusion-limited. Another important consideration is the heterogeneous nature of the crystalline polypropylene of commerce, which actually is semi-crystalline, a typical crystalline/noncrystalline phase ratio by volume being about 60/40. A means is needed to effect the recombination of the free radicals produced in the polypropylene irradiation process, and finally the deactivation of residual free radicals, in a controlled manner so that predictable results can be achieved irrespective of the diffusion limitations and polymer heterogeneity mentioned above.

SUMMARY OF THE INVENTION

This invention provides an improvement in a method of making high-molecular-weight, long-chain branched propylene polymer material from linear normally solid, high-molecular-weight semi-crystalline propylene polymer material, which method includes the steps of irradiating the linear polymer material with high-energy ionizing radiation and thermally deactivating residual free radicals in the irradiated polymer material, all steps of said method being carried out in an oxygen-deficient environment, i.e., an environment in which an active-oxygen concentration of less than about 15%, and preferably less than about 5%, by volume is maintained. The improvement provided by the invention comprises heating the free-radical-containing, optionally room-temperature-aged, irradiated polymer material in the described environment at a temperature in the range of about from 40° C. to 110° C., and preferably to a maximum temperature of about 80° C., for at least about 10, and preferably at least about 30 and up to a maximum of about 120, minutes prior to deactivating residual free radicals.

In another embodiment of the invention, the heating process which constitutes the improvement set forth above, when performed in combination with a subsequent thermal deactivation step, forms a two-stage heating process which comprises heating a normally solid free-radical-containing, optionally room-temperature-aged, irradiated high-molecular-weight semi-crystalline propylene polymer material in a first stage at a temperature ($T_1$) in the range of about from 40° C. to 110° C., and preferably up to a maximum of about 80° C., for at least about 10, and preferably at least about 30 and up to a maximum of about 120, minutes; and in a second stage at a temperature ($T_2$) of at least about 120° C., and preferably below the melting point of the polymer material, e.g., in the range of about from 130° C. to 150° C., for a time, e.g., at least about 20 minutes, sufficient to allow deactivation of substantially all residual free radicals, said heating being conducted in an environment in which an active-oxygen concentration of less than about 15%, and preferably less than about 5%, by volume is maintained.

Carrying out the two heating stages in a series of fluid bed assemblies is a preferred way of performing the process as this eliminates the inconvenience and expense of melting, resolidifying, and comminuting the irradiated polymer material. Melt extrusion techniques may be employed in the second stage of the process, however, and, in such cases, $T_2$ may exceed about 165° C.

While one or both of said two heating stages may be operated in two or more substages, e.g., at consecutively higher temperatures $T_{1a}$, $T_{1b}$, ... $T_{1n}$ all within the specified range for $T_1$ in the first stage, and $T_{2a}$, $T_{2b}$, ... $T_{2n}$ all within the specified range for $T_2$ in the second stage, such operation usually will not be required and therefore in a preferred method of the invention, the irradiated polymer is heated in a total of two undivided stages.

When the two-stage heating process of the invention is applied to a propylene polymer material which has been irradiated as described in the aforementioned European publication, whereby a long-chain branched propylene polymer material is produced, the result is a process wherein residual free radicals are utilized more efficiently than heretofore, allowing a higher weight average molecular weight (Mw) and a higher degree of branching to be achieved with a given radiation dose, or enabling the achievement of a given weight average molecular weight and degree of branching at a lower radiation dose. This improvement is in greatest evidence as the free radical content of the irradiated polymer is higher, e.g., when applied to polymers which have been exposed to radiation doses of about 3 Mrad or more, and thus greater benefits may be gained by use of the present process with such polymers.

DETAILED DESCRIPTION

Figure 1:
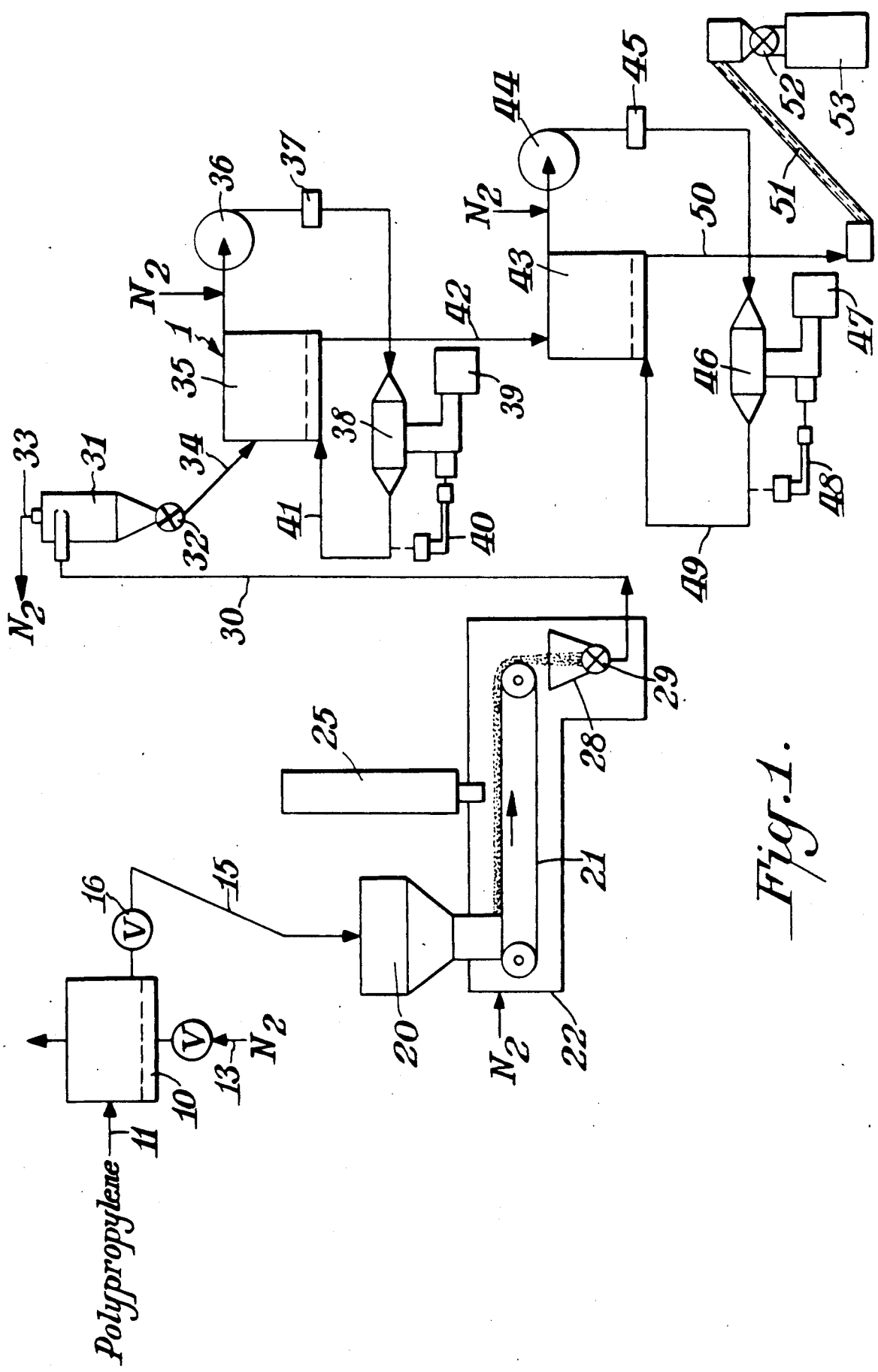
FIG. 1 is a schematic flow sheet of a two-stage fluid bed system for carrying out the two-stage heating process of the present invention as an adjunct to a polypropylene irradiation process described in the aforementioned European publication.

The free-radical-containing irradiated semi-crystalline propylene polymer material which is subjected to the staged heating process of this invention is one which has been prepared by irradiating linear propylene polymer material with high-energy ionizing radiation in an oxygen-deprived environment, according to the first step of the process described in the aforementioned European patent application.

In the irradiation process, a normally sold, high-molecular-weight, gel-free propylene polymer material with strain-hardening elongational viscosity (essentially a long-chain branched polymer) is made by irradiating a normally solid, high-molecular-weight semi-crystalline (at least about 5-10% crystallinity) propylene polymer material without strain-hardening elongational viscosity (essentially a linear polymer) with high-energy ionizing radiation at a dose rate in the range of about from 1 to $1 \times 10^4$ megarads per minute for a period of time sufficient for a substantial amount of chain scission of the amorphous content of the material to occur, but insufficient to cause gelation of the material. The irradiation is performed in an environment in which the active oxygen concentration is established and maintained at less than about 15%, preferably less than 5%, and more preferably less than about 1%, by volume of the environment. The most preferred concentration of active oxygen is 0.004% or lower by volume.

The ionizing radiation used to produce the irradiated polymer that constitutes the starting material for the process of the present invention should have sufficient energy to penetrate to the extend desired the mass of linear, propylene polymer material being irradiated. The energy must be sufficient to ionize the molecular structure and to excite atomic structure, but not sufficient to affect atomic nuclei. The ionizing radiation can be of any kind, but the most practical kinds comprise electrons and gamma rays. Preferred are electrons beamed from an electron generator having an accelerating potential of 500-4,000 kilovolts. In the case of propylene polymer material without a polymerized diene content, satisfactory results are obtained at a dose of ionizing radiation of about 1-12 megarads, preferably 3-8 megarads, delivered generally at a dose rate of about 1-10,000 megarads per minute, and preferably about 18-2,000 megarads per minute. In the case of propylene polymer material having a polymerized diene content, satisfactory results are obtained with a dose of about 0.25 megarad—about 1.5 megarads, preferably about 0.5 megarad —1.5 megarads, delivered at the foregoing dose rates.

The term "rad" is usually defined as that quantity of ionizing radiation that results in the absorption of 100 ergs of energy per gram of irradiated material, regardless of the source of radiation. In the usual practice of the process described in the aforementioned European application publication, energy absorption from ionizing radiation is said to be measured by the well-known conventional dosimeter, a measuring device in which a strip of fabric containing a radiation sensitive dye is the energy absorption sensing means. Hence, as used in this specification the term "rad" means that quantity of ionizing radiation resulting in the absorption of the equivalent of 100 ergs of energy per gram of the fabric of a dosimeter placed at the surface of the linear, propylene polymer material being irradiated, whether in the form of a bed or layer of particles, or a film, or a sheet.

As used herein, "propylene polymer material" means propylene polymer material selected from the group consisting of (a) homopolymers of propylene, (b) random copolymers of propylene and an olefin selected from the group consisting of ethylene, $C_4$-$C_{10}$ 1-olefins, and $C_4$-$C_{10}$ dienes, provided that, when said olefin is ethylene, the maximum polymerized ethylene content is about 5 (preferably about 4) % by weight, when said olefin is a $C_4$-$C_{10}$ 1-olefin, the maximum polymerized content thereof is about 20 (preferably about 16) % by weight, and when said olefin is a $C_4$-$C_{10}$ diene, the maximum polymerized content thereof is about 5 (preferably about 4) % by weight, and (c) random terpolymers of propylene and 1-olefins selected from the group consisting of ethylene and $C_4$-$C_8$ 1-olefins, provided that the maximum polymerized $C_4$-$C_8$ 1-olefin content is about 20 (preferably about 16) % by weight, and when ethylene is one of said 1-olefins, the maximum polymerized ethylene content is about 5 (preferably about 4) % by weight. The $C_4$-$C_{10}$ 1-olefins include the linear and branched $C_4$-$C_{10}$ 1-olefins such as, for example, 1-butene, isobutylene, 1-pentene, 3-methyl-1-butene, 1-hexene, 3,4-dimethyl-1-butene, 1-heptene, 3-methyl-1-hexene, and the like. Examples of $C_4$-$C_{10}$ dienes include 1,3-butadiene, 1,4-pentadiene, isoprene, 1,5-hexadiene, 2,3-di-methyl-1,3-hexadiene, and the like.

Also, as used herein, "high molecular weight" means weight average molecular weight of at least about 100,000, and "semi-crystalline" means a crystallinity of at least about 5-10 % as measured by x-ray diffraction.

According to the present process, the semi-crystalline propylene polymer material, after having undergone irradiation, as described above, is subjected to a staged heating process to accomplish (a) the partial recombination of free radicals present therein, and, thereafter, (b) the deactivation of free radicals still remaining therein. This process is based on the finding that the semi-crystalline nature of polypropylene, which is a characteristic of the commercial product, has an effect on the decay behavior of the radicals during aging. Because radical decay (and hence recombination) is slower in the crystalline phase than it is in the non-crystalline phase, the material undergoes only partial free-radical decay as a result of a brief room-temperature aging period. As a consequence, because any residual free radicals which have not undergone recombination to form long-chain branches are destroyed in the deactivation stage, there is poor utilization of the residual radical population.

In the present process, the free-radical-containing irradiated polymer material is heated in a first stage at a temperature which, over the selected time period employed, allows the partial recombination of free radicals (associated with the crystalline phases) which have survived any initial room-temperature aging that the polymer may have undergone. This results in the formation of more long-chain branches and thus a better utilization of residual free radicals. Although it is not necessary that the irradiated polymer have undergone a preliminary room-temperature aging step, inasmuch as radicals which are labile enough to recombine at room temperature will recombine in the first heating stage, as a practical matter there probably always will be a lag time between the exit of the material from the irradiation equipment and its arrival at the first heating stage so that the polymer which reaches that stage will have undergone some degree of partial radical recombination (associated with the non-crystalline phases). Room-temperature aging for up to about 2 hours prior to the first heating stage, while generally not practical, can be used, if desired.

While the present process can be carried out in any number of successive heating stages run at successively higher temperatures, only two stages are required, i.e., a first stage at a moderately elevated temperature to effect recombination of the residual radicals, and a second stage at a higher temperature to deactivate any remaining radicals to such a degree as to render the material stable on long-term storage in the presence of oxygen. The temperature range within which the temperature $T_1$ of the first stage should fall extends from slightly above room temperature, i.e., about 40° C., to about 110° C., longer heating times being required to achieve a given degree of recombination toward the lower end of the operating temperature range. A preferred temperature range for the thermal recombination stage is about from 40° C. to 80° C. Operating within this preferred range permits a maximum degree of radical recombination to occur within a reasonable length of time, e.g., about from 0.5 to 2 hours, and provides maximum assurance that the radicals will not be destabilized towards fragmentation reactions and radical-terminating disproportionation reactions.

After the irradiated polymer material has been heated in the first stage at $T_1$, it is exposed to a higher temperature $T_2$ to allow deactivation of any residual free radicals to occur. $T_2$ will be at least about 120° C., and preferably at least about 130° C. While temperatures as high as about 250° C. can be used in the deactivation stage, it often will be preferred to select a $T_2$ which is below the melting point of the polymer, i.e., a maximum of about 160° C. for propylene homopolymers and lower for propylene copolymers.

A preferred way of carrying out the two-stage heating process of the invention is to pass the irradiated polymer through a first fluid bed assembly operating at $T_1$ and then through a second fluid bed assembly operating at $T_2$. The fluidizing medium can be, for example, nitrogen or any other gas which is inert with respect to the free radicals present, e.g., argon, krypton, and helium. Unlike some techniques, such as melt extrusion methods, the fluidized bed method does not require the conversion of the irradiated polymer into the molten state and subsequent resolidification and comminution back into the desired form.

In the flow sheet shown in FIG. 1, elements designated by numerals 10 through 34 are combined as shown to form an apparatus described in the aforementioned European publication 190,889, for carrying out the first step of the process described therein, i.e., an irradiation step. In FIG. 1, 10 is a fluid bed unit of conventional construction and operation into which finely divided, high-molecular-weight, linear propylene polymer material is introduced by way of conduit 11, and an inert gas such as nitrogen is introduced by way of conduit 13. Substantially active-oxygen-free, high-molecular-weight, linear propylene polymer material is removed from unit 10 by way of a solids discharge conduit 15, which also has a solids flow-rate controller 16. The solids discharge conduit 15 leads to a conveyor-belt feed hopper 20.

The conveyor-belt feed hopper 20 is a capped structure of conventional design. It is operated so that its interior contains an atmosphere free of active oxygen, e.g., a nitrogen atmosphere. It has a bottom solids discharge outlet through which the particles of linear propylene polymer material move and form a layer on the top horizontal run of an endless conveyor belt 21.

The conveyor belt 21 is generally horizontally disposed, and continuously moves under normal operative conditions. It is contained in radiation chamber 22. This chamber completely encloses the conveyor belt, and is constructed and operated to establish and maintain an atmosphere free of active oxygen in its interior.

In combination with the radiation chamber 22 is an electron beam generator 25 of conventional design and operation. Under normal operative conditions it generates a beam of high energy electrons directed to the layer of particles of linear propylene polymer material on the conveyor belt 21. Below the discharge end of the conveyor belt is a solids collector 28 arranged to receive the irradiated propylene polymer material falling off the conveyor belt 21 as it turns into its path of opposite travel. Irradiated particles of propylene polymer material in the solids collector 28 are removed therefrom by a rotary valve or star wheel 29 and delivered thereby to a solids transfer line 30.

The transfer line 30 leads to a gas-solids separator 31. This unit is of conventional construction and usually is a cyclone type separator. Gas separated therein is removed as by gas discharge conduit 33 while separated solids are discharged therefrom as by a rotary valve or star wheel 32 into a solids discharge line 34. The solids discharge line 34 leads to fluid bed unit 35.

This fluid bed unit is of conventional design, is sealed, and is constructed and operated to establish and maintain an atmosphere free of active oxygen, e.g., a nitrogen atmosphere, in its interior. By way of conduit 1, an inert gas is introduced into fluid bed 35 via a closed loop assembly containing blower 36, damper 37, and heat exchanger 38. Butterfly damper 37 is used to control and maintain a desired inert gas velocity through the fluid bed. Circulating gas passes through heat exchanger 38, where it is heated to the desired temperature. An oil circulating system 39 and temperature control loop 40 are used to maintain the desired temperature of the heat exchanger. The thus-heated gas passes through conduit 41 into the underside of the fluid bed plenum and through a distributor plate. The velocity of the gas is maintained so as to produce a fluidizing action in the polymer particle bed. The interior of the fluid bed is baffled so as to provide a narrow controlled residence time of the particles within the bed. The depth of the particle bed is maintained by an adjustable weir. Average particle residence time in the bed is maintained by way of the flow rate of irradiated polymer entering the bed and the height of the adjustable weir.

Propylene polymer material which exits the unit through the adjustable weir passes through discharge line 42 into a second fluid bed unit 43. This fluid bed unit is of conventional design and an inert gas such as nitrogen is again used as the fluidizing medium. Blower 44, butterfly valve 45, heat exchanger 46, oil heater 47, temperature control unit 48, and conduit 49 are used to maintain gas velocity and gas temperature at the desired level. The velocity of the heated fluidizing gas is maintained so as to produce a fluidizing action within the polymer bed. Fluid bed 43 is also baffled so as to provide a narrow controlled residence time of the polymer particles within the bed. An adjustable weir is used to maintain the desired bed height within the fluid bed. Heated particles which exit the fluid bed through the adjustable weir are fed through discharge line 50 into a water-jacketed conduit 51 where they are transported via a flexible auger. The polymer is cooled to room temperature upon passing through the water-jacketed conduit. The polymer then passes through a rotary valve 52 into a collection drum 53. The rotary valve 52 serves as a boundary between the inert gas atmosphere in the water-jacketed conduit 51 and the oxygen-containing atmosphere in the collection drum 53.

The following examples, presented for illustrative purposes, describe preferred embodiments of the present process.

EXAMPLES 1 AND 2

The irradiated propylene polymer material used as the starting material was prepared according to the first step of the process described in the aforementioned European application publication, and, more specifically, as follows, with reference to FIG. 1:

A finely divided (flake) high-molecular-weight, linear polypropylene of commerce, having a conventional phenolic antioxidant content of about 0.001% by weight and characterized by a nominal melt flow rate (dg/min, ASTM Method D 1238, Condition L) of 0.2 and density (g/cm$^3$, ASTM D 792A-2) of 0.902, was introduced into fluid bed unit 10 and fluidized with nitrogen for 60 minutes.

The thus-treated substantially active-oxygen-free, high-molecular-weight, linear polypropylene powder then was dropped into hopper 20, which laid it on the moving conveyor belt 21 (200-mesh stainless steel) to form a bed of polypropylene powder 1.4 cm thick and 35.5 cm wide. The bed of powder was passed by the conveyor belt 21 through an electron beam generated by a 2 MeV Van de Graff generator 25 operating at a 250 microamp beam current with a scanned beam width of 45.7 cm at the top surface of the conveyor belt 21. The conveyor belt speed was adjusted to provide a desired absorbed surface dose. In addition, the active oxygen content of the environment or atmosphere within the enclosed radiation chamber 22 and in the remaining part of the system was established and maintained at less than 0.004% by volume.

The estimated lag time for passage of the irradiated polymer from radiation chamber 22 to fluid bed 35 was 2-5 minutes. During this time the polymer was exposed to a temperature of about 30° C. The baffled design of fluid beds 35 and 43 provided serpentine flow of the particles such that essentially all particles were exposed to the bed temperature for at least 5 minutes, with an average residence time as shown below.

The first fluid bed was operated at 80° C., and the second at 130° C. In Example 1 the irradiated polypropylene had been subjected to a 6 Mrad dose, and in Example 2 an 8 Mrad dose. Control experiments were performed by heating the irradiated polymer at 130° C. in both stages. The results are shown in the following table:

TABLE I

| Ex. | Control Expt. | Dose (Mrad) | Stage 1 | | Stage 2 | | IV$^{(a)}$ dl/g | MFR$^{(b)}$ dg/min | Mw$^{(c)}$ g/mole | BI$^{(d)}$ |
|---|---|---|---|---|---|---|---|---|---|---|
| | | | T$_1$ (°C.) | Av Residence Time (min) | T$_2$ (°C.) | Av Residence Time (min) | | | | |
| 1 | | 6 | 80 | 30 | 130 | 60 | 2.16 | 2.4 | 800000 | 0.40 |
| | 1 | 6 | 130 | 30 | 130 | 30 | 2.03 | 4.5 | 500000 | 0.61 |
| 2 | | 8 | 80 | 40 | 130 | 80 | 2.18 | 2.4 | 1350000 | 0.29 |
| | 2 | 8 | 130 | 30 | 130 | 30 | 2.05 | 5.3 | 820000 | 0.41 |

$^{(a)}$Intrinsic viscosity, J. H. Elliott et al., J. Appl. Polymer Sci. 14, 2947-2963 (1970). Polymer dissolved in decahydronaphthalene at 135° C.
$^{(b)}$Melt flow rate, ASTM 1238-82, Condition L.
$^{(c)}$Weight average molecular weight, M. L. McConnell, Am. Lab., May 1978: "Polymer Molecular Weights and Molecular Weight Distribution by Low-Angle Laser Light Scattering".
$^{(d)}$Branching index = [IV]$_{Br}$/[IV]$_{Lin}$. Ratio of the IV of the branched polypropylene to the IV of the corresponding linear polymer of substantially the same Mw. A value of 1.0 indicates the absence of significant long-chain branching, while values less than one indicate the presence of detectable long-chain branches. The lower the number, the greater the extent of long-chain branching.

The above examples and control experiments show that, for polypropylene irradiated at the indicated doses, a polymer having a higher intrinsic viscosity and weight average molecular weight, a lower branching index (higher degree of long-chain branching), and a lower melt flow rate is obtained when the irradiated polypropylene is subjected to post-irradiation heating in two stages at two different temperatures, a first thermal aging stage at an intermediate temperature, in this case 80° C., and a second radical quenching stage at a higher temperature, in this case at 130° C., than when the same irradiated polypropylene that has undergone the same radiation dose is subjected to post-irradiation heating at the quenching temperature only, i.e., 130° C. This effect is shown for two different radiation doses, i.e., 6 Mrad (Example 1) and 8 Mrad (Example 2). These examples show that the molecular weight difference between polymer which has undergone two-stage heating and that which has undergone single-stage heating increases with irradiation dose. The examples also show that a given molecular weight and degree of branching can be achieved with a lower dosage if the irradiated polymer is heated at an intermediate temperature (80° C. in this instance) prior to thermal quenching (at 130° C. in this instance).

Above a certain threshold dose, the weight average molecular weight increases with irradiation dose regardless of whether the irradiated polymer undergoes two-stage heating at two different temperatures or heating at the second stage temperature only. When only the second stage temperature is employed, the melt flow rate increases with dose also. However, in irradiated polymer treated in two different heating stages according to the present process, the melt flow rate is not increased concomitantly with the molecular weight as the dosage increases. Therefore, while heretofore the attainment of higher molecular weight (by dosage increase) necessitated the acceptance of a higher flow rate, the present process permits a molecular weight increase without significantly affecting the melt flow rate.

The propylene polymer material produced according to this invention can be converted into useful products by extrusion coating, including, but not limited to fabric coating and wire and cable coating; melt extrusion, including, but not limited to, sheet extrusion and coextrusion; profile extrusion; spinning operations to produce fibers, such as melt spinning, including, but not limited to, melt blowing and spun-bonding operations to produce fibers; stretching, uniaxially or biaxially, to form film, including, but not limited to, heat shrinkable film, strapping and slit-tape film; blow molding operations; foaming operations to produce foamed articles, including, but not limited to, high and low density foamed articles; synthetic pulp operations; molding operations, such as injection and compression molding; netting operations; and thermoforming operations. The propylene polymer material of this invention can also be blended with normally solid, isotactic, semi-crystalline, linear propylene polymer materials and with other polymeric materials, such as polyethylene, polyphenylene ethers, polyamides, homopolymers and copolymers (random and block) of styrene, polyurethanes, polycarbonates, ethylene-propylene copolymer rubbers, ethylene-propylene terpolymers rubbers and polyesters.

EXAMPLE 3

Samples of the flake linear polypropylene used in Examples 1 and 2 (except that in this case the polymer's nominal melt flow rate was 5.0 dg/min), substantially free of active oxygen, were irradiated in evacuated and sealed 8-mm O.D. pyrex test tubes by exposure to 2 MEV using a Van de Graff electron accelerator operating at a beam current of 250 microamps. The dose was 3 Mrad. The irradiated samples were aged for 10 minutes at room temperature, and then the tubes were placed in an oil bath at selected temperatures for selected times. Finally, they were maintained in 155° C. oil for 2 hours.

Figure 2:
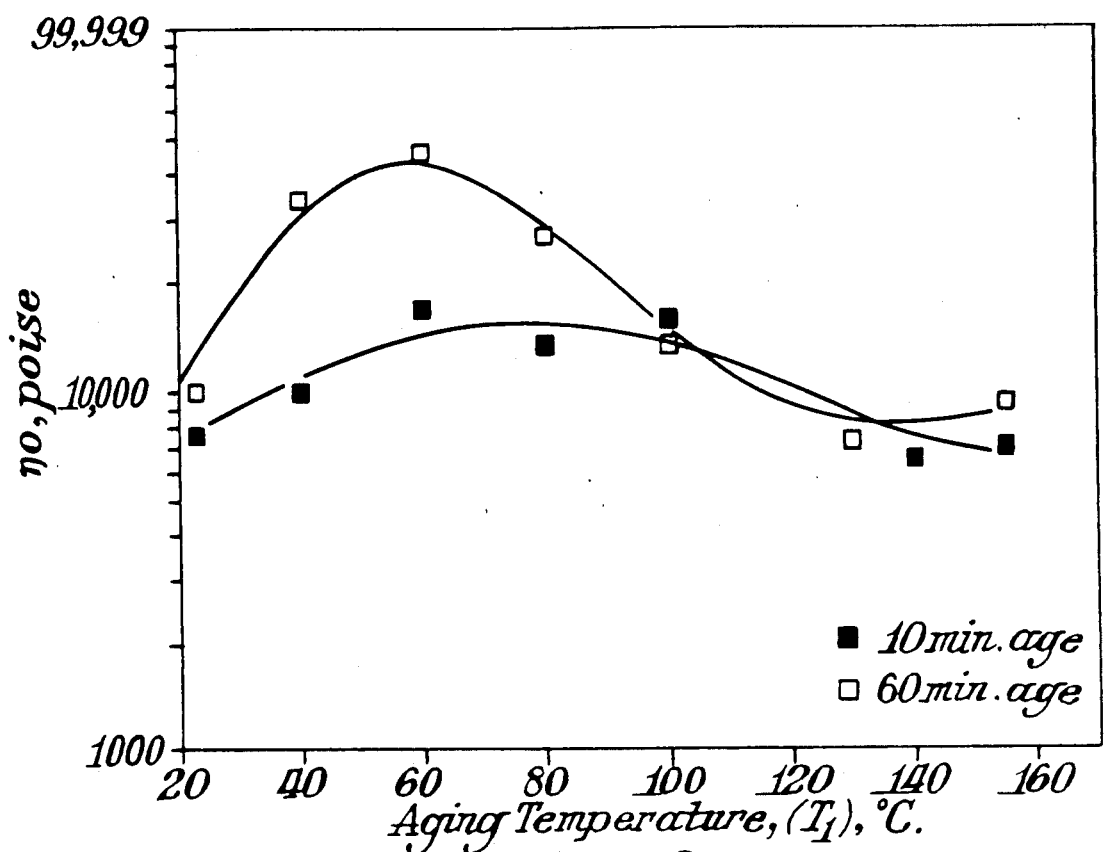
FIGS. 2, 3 and 4 are plots of the zero shear viscosity, weight average molecular weight, and branching index of post-irradiation heated polypropylene, respectively, versus aging temperature, $T_1$, at two different heating times.
Figure 3:
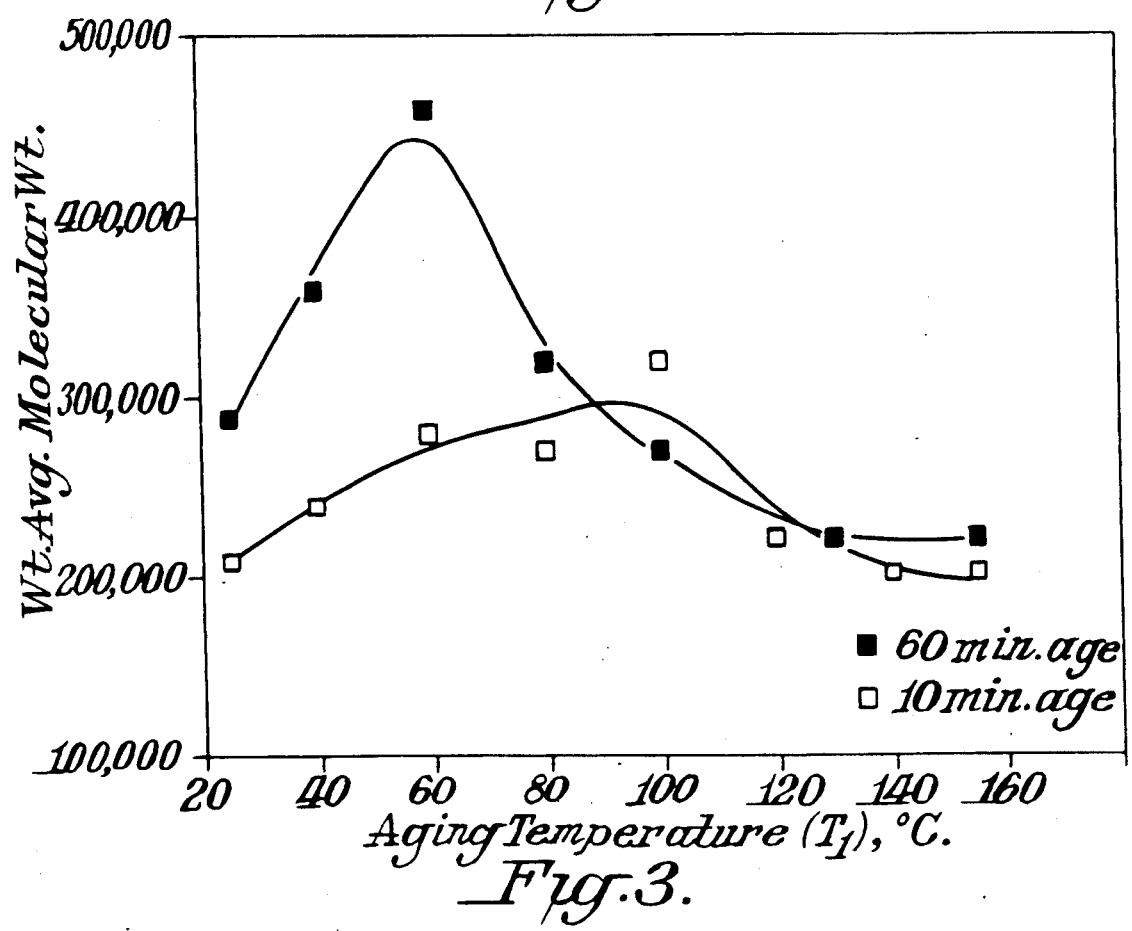
Figure 4:
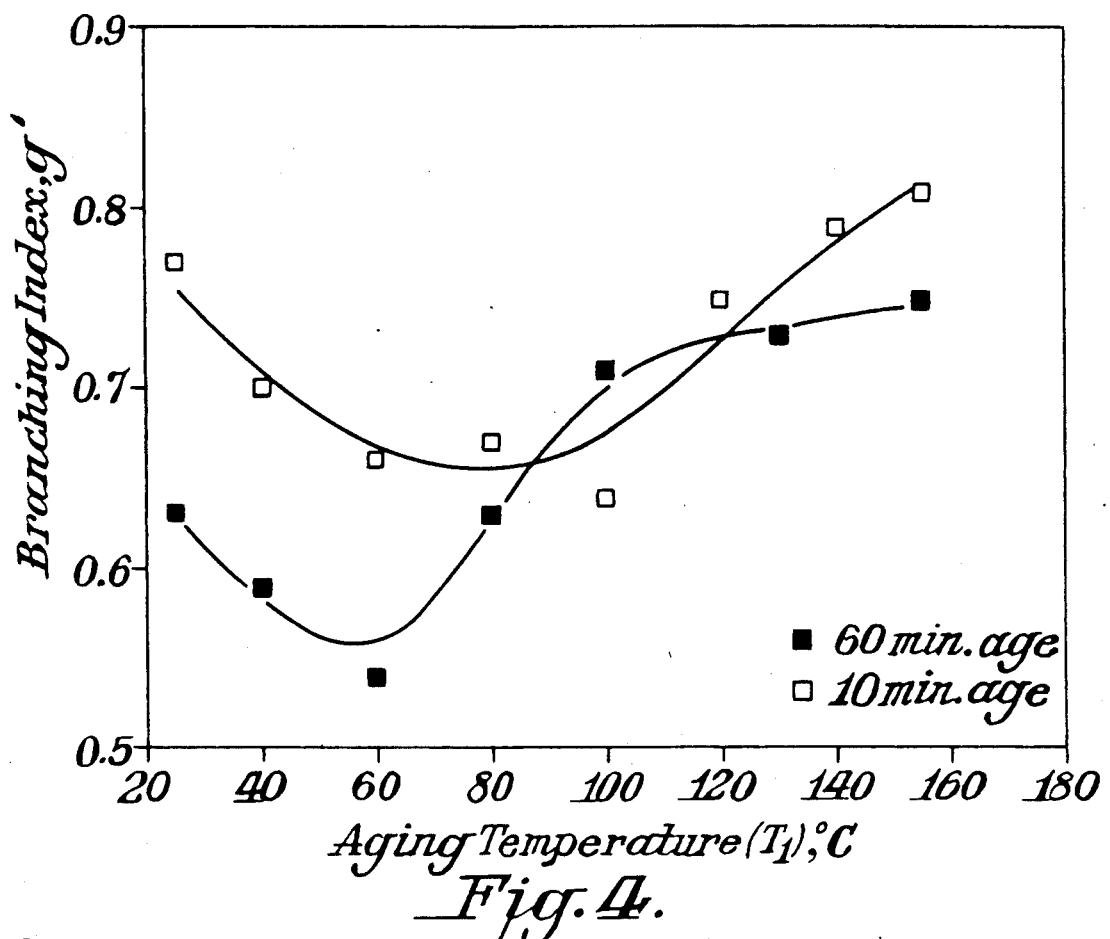
Figure 5:
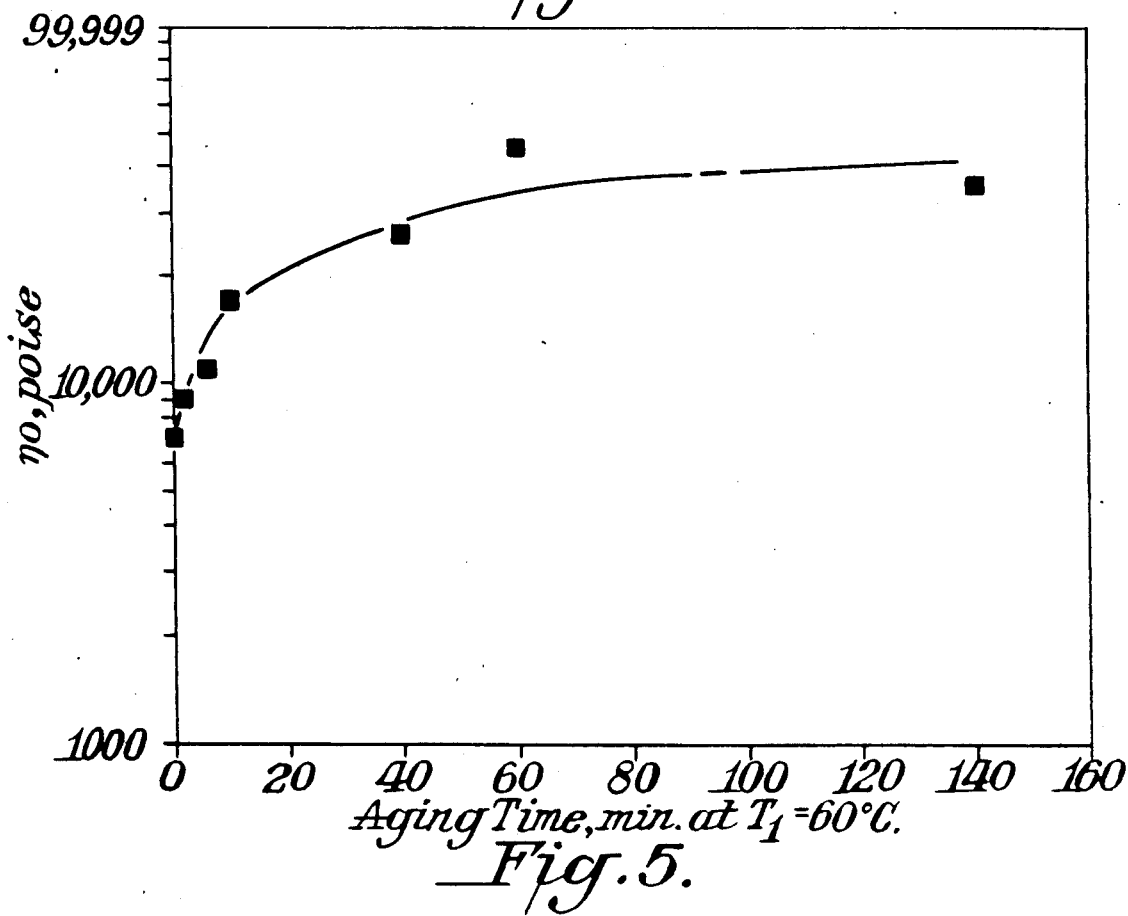
FIGS. 5, 6 and 7 are plots of the zero shear viscosity, weight average molecular weight, and branching index of the product, respectively, versus aging time at a fixed aging temperature, $T_1$.
Figure 6:
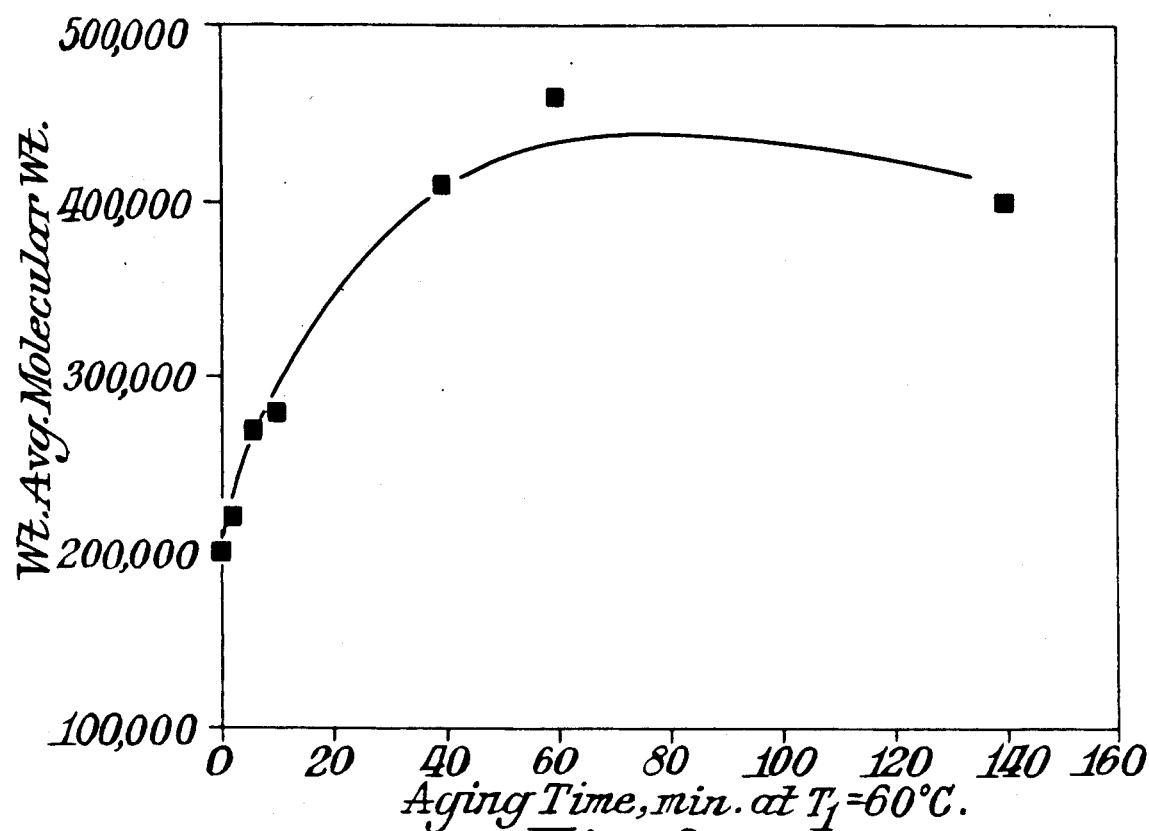
Figure 7:
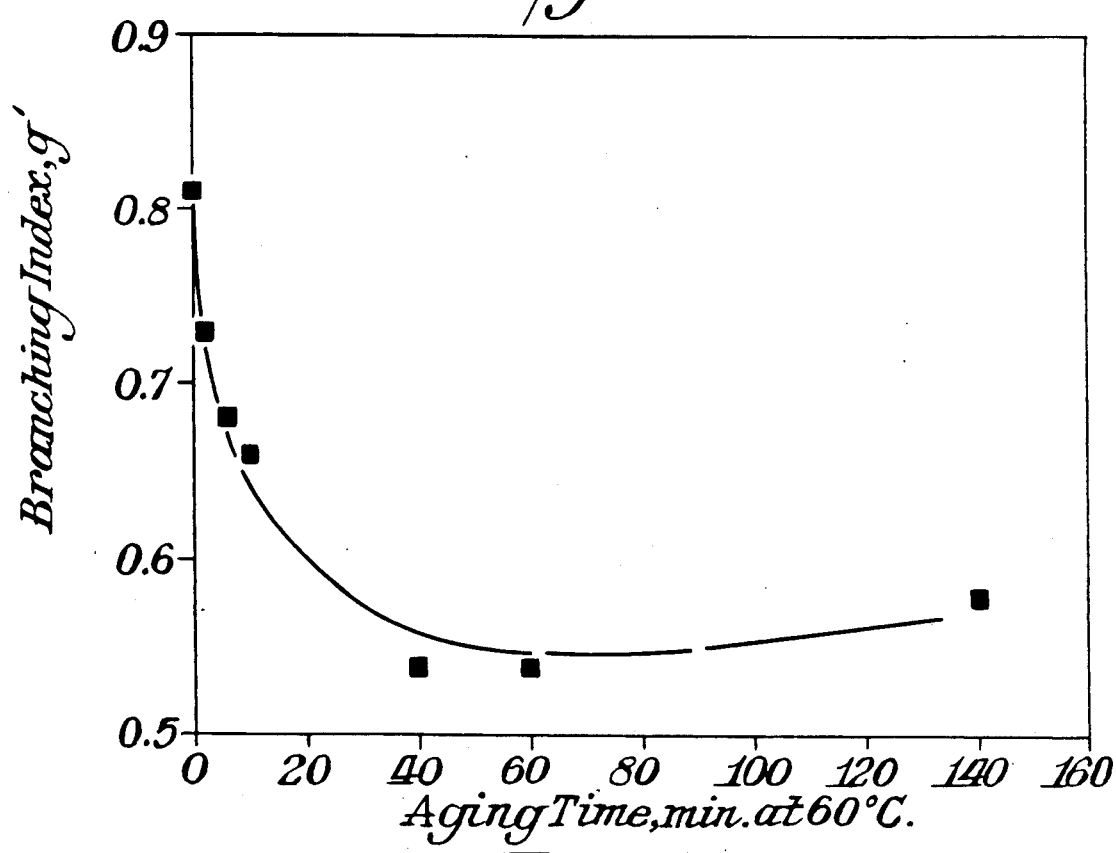

The zero shear viscosity, weight average molecular weight, and branching index of the products obtained under different thermal conditions were determined, and the results plotted to form the curves shown in FIGS. 2 through 7. The effect of aging temperature (first heating stage) at two different heating times on the zero shear viscosity, weight average molecular weight, and branching index is shown in FIGS. 2, 3 and 4, respectively; while FIGS. 5, 6 and 7 show the effect of aging time at a fixed aging temperature on zero shear viscosity, weight average molecular weight, and branching index, respectively.

It can be seen from FIGS. 2, 3 and 4 that, for a given polymer and exposure dose, the zero shear viscosity and the weight average molecular weight increase to a maximum, and the branching index decreases to a minimum, as the temperature $T_1$ in the first stage of the process increases, the maximum $\eta_o$ and Mw being higher and the minimum BI being lower at longer aging times (60 minutes vs. 10 minutes). FIGS. 5, 6 and 7 show that, at a given temperature (60° C.), $\eta_o$ and Mw increase, and BI decreases, with aging time to a levelling-off point at about 30 to 40 minutes.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. In a method of making high-molecular-weight, long-chain branched propylene polymer material from linear semi-crystalline normally solid propylene polymer material in an environment in which an active-oxygen concentration of less than about 15% by volume is maintained, which method includes the steps of irradiating said linear polymer material with high-energy ionizing radiation and thermally deactivating residual free radicals in the irradiated polymer material, the improvement comprising heating the irradiated polymer material at a temperature in the range of about from 40° C. to 110° C. for at least about 10 minutes prior to deactivating residual free radicals.

2. The method of claim 1 wherein said irradiated polymer material is heated at a temperature up to about 80° C. for at least about 30 minutes, and the active-oxygen concentration maintained in said environment is 0.004% or less.

3. The method of claim 2 wherein said irradiated polymer material is heated for up to about 2 hours.

4. The method of claim 1 wherein said irradiated polymer material is heated by passage through a fluid bed assembly.

5. The method of claim 4 wherein said irradiated polymer material is held at approximately room temperature for up to about 2 hours before its entry into said fluid bed assembly.

6. A method of treating irradiated propylene polymer material comprising, in an environment in which an active-oxygen concentration of less than about 15% by volume is maintained, heating a free-radical-containing irradiated semi-crystalline propylene polymer material in a first stage at a temperature $T_1$ in the range of about from 40° C. to 110° C. for at least about 10 minutes, and in a second stage at a temperature $T_2$ of at least about 120° C. for a time sufficient to allow deactivation of substantially all residual free radicals.

7. The method of claim 6 wherein, in the first of said stages, said material is heated at a temperature $T_1$ up to about 80° C. for about from 30 to 120 minutes; in the second of said stages, said material is heated at a temperature $T_2$ of at least about 130° C. for at least about 20 minutes; and the active-oxygen concentration maintained in said environment is 0.004% or less.

8. The method of claim 7 wherein $T_2$ is below the melting point of said propylene polymer material.

9. The method of claim 8 wherein said irradiated polymer material is passed through a first fluid bed assembly in said first stage, and through a second fluid bed assembly in said second stage.

10. The method of claim 9 wherein said irradiated polymer material is held at approximately room temperature for up to about 2 hours before its entry into said first fluid bed assembly.

11. The method of claim 7 wherein $T_2$ is above the melting point of said propylene polymer material.

12. The method of claim 11 wherein, in said second stage, said propylene polymer material is extruded in the molten condition.

* * * * *